(12) United States Patent
Gingras et al.

(10) Patent No.: US 8,712,820 B2
(45) Date of Patent: Apr. 29, 2014

(54) MOBILE APPLICATION FOR CALENDAR SHARING AND SCHEDULING

(75) Inventors: Marc Gingras, Verdun (CA); Fang Yang, Waterloo (CA); Jacou Sarrazin, Repentigny (CA)

(73) Assignee: Blackberry Limited, Waterloo, Ontario (CA)

( * ) Notice: Subject to any disclaimer, the term of this patent is extended or adjusted under 35 U.S.C. 154(b) by 487 days.

(21) Appl. No.: 12/886,022

(22) Filed: Sep. 20, 2010

(65) Prior Publication Data

US 2011/0071878 A1  Mar. 24, 2011

Related U.S. Application Data

(60) Provisional application No. 61/244,068, filed on Sep. 20, 2009.

(51) Int. Cl.
   *G06Q 10/00*         (2012.01)
(52) U.S. Cl.
   USPC ............................................. 705/7.18
(58) Field of Classification Search
   USPC ............................................. 705/7.18
   See application file for complete search history.

(56) References Cited

U.S. PATENT DOCUMENTS

| | | | |
|---|---|---|---|
| 5,124,912 A * | 6/1992 | Hotaling et al. | 705/7.19 |
| 6,104,788 A | 8/2000 | Shaffer et al. | |
| 7,792,794 B2 * | 9/2010 | Mills et al. | 707/614 |
| 8,126,759 B2 * | 2/2012 | Robertson et al. | 705/7.19 |
| 2003/0204474 A1 * | 10/2003 | Capek et al. | 705/64 |
| 2003/0217073 A1 | 11/2003 | Walther et al. | |
| 2004/0093290 A1 * | 5/2004 | Doss et al. | 705/35 |
| 2004/0155860 A1 * | 8/2004 | Wenstrand et al. | 345/156 |
| 2006/0017692 A1 * | 1/2006 | Wehrenberg et al. | 345/156 |
| 2006/0200374 A1 * | 9/2006 | Nelken | 705/9 |
| 2007/0075966 A1 * | 4/2007 | Daniel | 345/156 |
| 2007/0208604 A1 * | 9/2007 | Purohit et al. | 705/9 |
| 2008/0115196 A1 * | 5/2008 | Michel et al. | 726/4 |
| 2009/0179914 A1 | 7/2009 | Dahlke | |
| 2009/0228825 A1 * | 9/2009 | Van Os et al. | 715/780 |
| 2009/0319504 A1 * | 12/2009 | Alberth et al. | 707/5 |

OTHER PUBLICATIONS

"Apple Boss Shows off New SHake and Shuffle iPod Nano". Sep. 10, 2008. The Courier-Mail. retrieved from <http://www.couriermail.com.au/news/technology-old/new-ipod-shaken-songs-stirred/story-e6frep10-1111117442689>.*

(Continued)

*Primary Examiner* — Romain Jeanty

(57) ABSTRACT

The embodiments discussed herein describe an application device and method for calendar sharing and scheduling over a communication network. When a meeting is to be scheduled between two or more participants, the organizing participant enters an identification of the participants and requests a time suggestion. In response to the request, information relating to the availability and/or preferences of each participant is gathered from one or more databases and processed centrally in a remote server to determine a block of time during which all the participants are commonly free. The block of time is pushed to a user interface for display. If the organizing user selects the block of time, a meeting request may be sent to the participants to confirm the meeting.

25 Claims, 11 Drawing Sheets

(56) References Cited

OTHER PUBLICATIONS

Orantia, Jenneth; "Apple iPod Nano (4G): Just Shake to Shuffle" Oct. 2, 2008. APC Magazine. retrieved from <http://apcmag.com/apple_ipod_nano_4g.htm>.*

"Urbanspoon on the iPhone". Jul. 10, 2008. retrieved from <http://www.urbanspoon.com/blog/27/Urbanspoon-on-the-iPhone.html>.*

Extended European Search report dated Aug. 16, 2013 that issued on European Patent Application No. 10816541.6.

"Finding Available Time in IBM Lotus Notes V8 Using the Scheduler UI" Bill Le, IBM Aug. 14, 2007, pp. 1-5, XP002708760 Retrieved from the Internet: URL:http://www.ibm.com/developerworks/lotus/library/notes8-time/ [retreived on Aug. 2, 2013].

* cited by examiner

MOBILE APPLICATION FOR CALENDAR SHARING AND SCHEDULING

CROSS-REFERENCE TO RELATED APPLICATIONS

This application claims priority under 35 USC §119(e) of U.S. provisional patent application 60/244,068, filed on Sep. 20, 2009, the specification of which is hereby incorporated by reference.

TECHNICAL FIELD

The present description relates to the field of computing and networking, and more specifically to online scheduling tools and methods.

BACKGROUND

Recent progress in mobile processing devices, and more specifically with regards to cellular phones, now permits using mobile phone devices to access internet-based tools and run mobile applications.

With the feature above came the appearance of online networking, contact and time management tools using application programming interfaces (API) to request remote procedures over the Internet. The adaptation of some of these applications for mobile phones has begun.

In light of all the different networking, contact and time management tools available on the market, it is difficult to find a single program or tool which interfaces with all the other tools. For example, some users have their calendar associated with their email, and synchronized with a database of their email provider e.g. Hotmail®, Gmail®, Yahoo® etc. Some other people have their calendar synchronized with their computer e.g. using Microsoft Outlook® etc. These programs do not interface with each other and the calendar information associated with the users is dispersed on several databases which are not interfaced with each other.

Therefore, when a meeting is needed between two or more users, an organizing user has to suggest a specific time and send a meeting request. If the other user(s) is/are not available in the time specified, they may either reject or propose another time. This sequence goes on and on until a time block is found during which all the users are free. Complexity of this scenario increases dramatically with the presence of user preferences and the multitude of users, until it becomes nearly impossible.

Therefore, it is preferable to consolidate all of these tools into one unique application that is able to manage contacts and schedule appointments with contacts using different programs and contact tools.

SUMMARY

There is thus a need for a mobile application and method for calendar sharing and scheduling which addresses at least some of the above discussed issues.

Herein proposed is an application device, user interface and method adapted for use with mobile phones or other mobile devices, which allows users to schedule meetings, share their calendar and their contact information with others; view other users' shared calendars and contact information when authorized; organize meeting schedules with other users, and request automatic scheduling suggestions while using their mobile phone.

In accordance with an aspect, there is provided an application device for scheduling a meeting of participants comprising an organizing participant to whom the application device is associated. Each participant has an identification and data entities associated with said identification. Said data entities are synchronized with a database. The application device comprises a processor having access to a remote server via a communication network, a user interface for receiving identifications of the participants and a database query from the organizing participant, and a memory operatively coupled to the processor for storing instructions to be performed by the processor.

When the instructions are performed by the processor, they cause the processor to: receive the identifications of the participants from the user interface; and upon receipt of the database query, communicate the identifications of the participants to the remote server over the communication network for the remote server to perform a search of the database and process data entities associated with each participant to determine a block of time during which all participants are free. The instructions also cause the processor to receive said block of time from the remote server; and output at least a portion of said block of time for display on the user interface.

In an embodiment, the user interface further receives a time duration from the organizing participant, and the instructions stored in the memory cause the processor to further: receive the time duration from the user interface, and upon receipt of the database query, communicate the time duration to the remote server to determine a block of time which comprises the meeting duration.

In another embodiment, the user interface further receives a selection of the block of time from the organizing participant; and the instructions stored in the memory cause the processor to receive the selection of the block of time from the user interface; and book the selected block of time on a calendar of the organizing participant.

In a further embodiment, the user interface further receives a meeting request from the organizing participant; and the instructions stored in the memory cause the processor to: receive the meeting request from the user interface; and send the meeting request to the participants in accordance with the block of time selected.

In yet a further embodiment, the instructions stored in the memory cause the processor to retrieve, from the remote server, calendars of the participants when settings associated with the calendars allow a sharing of the calendars with the organizing participant; and output the calendars to the user interface for display.

It is possible to repeat the search of the database to determine a different block of time during which all of the participants are commonly free, upon receipt of instructions from the user interface.

It is also possible to implement the application device for use with a mobile phone which includes an accelerometer, wherein the scheduling request is triggered by inducing a given acceleration to the accelerometer by manually shaking the mobile phone. In an embodiment, a further scheduling request is triggered by inducing the given acceleration to the accelerometers by manually shaking the mobile phone again thereby resulting in a determination by the server of a different block of time during which all of the participants are commonly free.

In one embodiment, only new blocks of time are output to the user interface for display in a new database query. In another embodiment, the database query takes into consideration at least one of filters and buffers pre-set by each participant.

The database may be associated with the remote server. It may be also be external and accessible by the remote server through a communication link. In an embodiment, the remote server may access more than one database to perform the database query.

In an embodiment, if no block of time is found during which all participants are free, the instructions stored in the memory cause the processor to display a message to that effect on the user interface.

In another embodiment, the user interface allows the organizing participant to select at least one of start time and enter time for the search. In this embodiment, if no end time is chosen for the search and no block of time is found during which all participants are free, the search may be performed within an unlimited future time frame.

In another aspect, there is provided a method for scheduling a meeting of participants each having an identification and data entities associated with said identification which are synchronized with a database. The method comprises receiving identifications of participants from a user interface, communicating the identifications of participants to a remote server over a communication network, and upon the user interface receiving a database query, forwarding the database query to the remote server, for the remote server to perform a search of the database and process data entities associated with each participant to determine a block of time during which all of the participants are commonly free. The method also comprises receiving said block of time from the remote server, and outputting at least a portion of the block of time for display on the user interface.

In one embodiment, the method may comprise the steps of receiving a meeting duration from the user interface; and communicating the meeting duration to the remote server to determine a block of time which comprises the meeting duration.

In another embodiment, the method may comprise receiving a selection of the block of time; and booking the block of time on a calendar associated with a user of the user interface.

In yet another embodiment, the method may comprise receiving a meeting request from the user interface; and sending the meeting request to the participants.

In accordance with another aspect, there is provided a mobile application device for calendar sharing comprising: a mobile processor having an access to a remote server via a communication network; a user interface for receiving a contact identification from a user, and for displaying a contact calendar associated with the contact identification; and a memory operatively coupled to the mobile processor for storing instructions to be performed by the mobile processor, the instructions implementing the mobile processor to: receive the contact identification from the user interface; communicate an identification of the user and the contact identification to the remote server over the communication network; retrieve, from the remote server, the contact calendar when a setting associated with the contact calendar allows a sharing of the contact calendar with the user; and send the contact calendar to the user interface for display to the user.

In an embodiment, the user interface receives a scheduling request from the user, and the instructions cause the processor to: receive the scheduling request from the user and forward the same to the remote server to perform a search of the contact calendar to determine a block of time during which the user and a contact associated with the contact identification are both commonly free.

In accordance with a further aspect, there is provided a method for calendar sharing and scheduling over a communication network, the method comprising: communicating a user identification and a contact identification over the communication network, from a mobile phone to a remote server; retrieving from the remote server, a calendar sharing setting associated with the contact identification; retrieving from the remote server, a contact calendar corresponding to the contact identification based on the calendar sharing setting and the user identification; and displaying the contact calendar on a display of the mobile phone.

In an embodiment, the method further comprises synchronizing a user calendar and a user contact with calendar and contact information of an external application, the user calendar and the user contact being one of: stored locally and on the remote server in association with the user identification.

In another embodiment, the method comprises, upon reception of a scheduling request, searching the contact calendar and the user calendar to determine a block of time of a user-specified meeting duration, during which a user associated with the user identification and a contact associated with the contact identification are both commonly free.

In yet a further aspect, there is provided a graphical user interface (GUI) for calendar sharing and scheduling, comprising: a contact field for allowing a user to perform at least one of: selecting a contact and inputting an identification of the contact; a calendar field comprising a plurality of contact calendar fields and respective contact identification icons, each one of the contact identification icons identifying a respective one of the user and the contact, and the contact calendar fields each respectively displaying at least a synchronized portion of a user calendar and of a contact calendar, as retrieved based on the identification of the contact; the calendar field comprising a time block selection zone above the contact calendar fields, for allowing the user to select a block of time; and an invitation icon for sending a meeting request to the contact based the block of time selected.

In still another aspect, there is provided a method for processing data entities associated with identifications of a respective participant from a group of participants. The method comprising: receiving the identifications of the participants; receiving a start time and an end time identifying a given period; receiving, from at least two databases, the data entities associated with each participants; processing the data entities associated with each participant, the data entities associated with each participants having a free status associated with free blocks of time, to select a block of time, from the free blocks of time, which is common to the data entities of each participant having a free status during the given period; and outputting at least a portion of said block of time which is common for display on a user interface.

DETAILED DESCRIPTION

The embodiments discussed herein describe an application device and method for calendar sharing and scheduling over a communication network. When a meeting is to be scheduled between two or more participants, the organizing participant enters an identification of the participants and requests a time suggestion. In response to the request, information relating to the availability and/or preferences of each participant is gathered from one or more databases and processed centrally in a remote server to determine a block of time during which all the participants are commonly free. The block of time is pushed to a user interface for display. If the organizing user selects the block of time, a meeting request may be sent to the participants to confirm the meeting.

Figure 1:
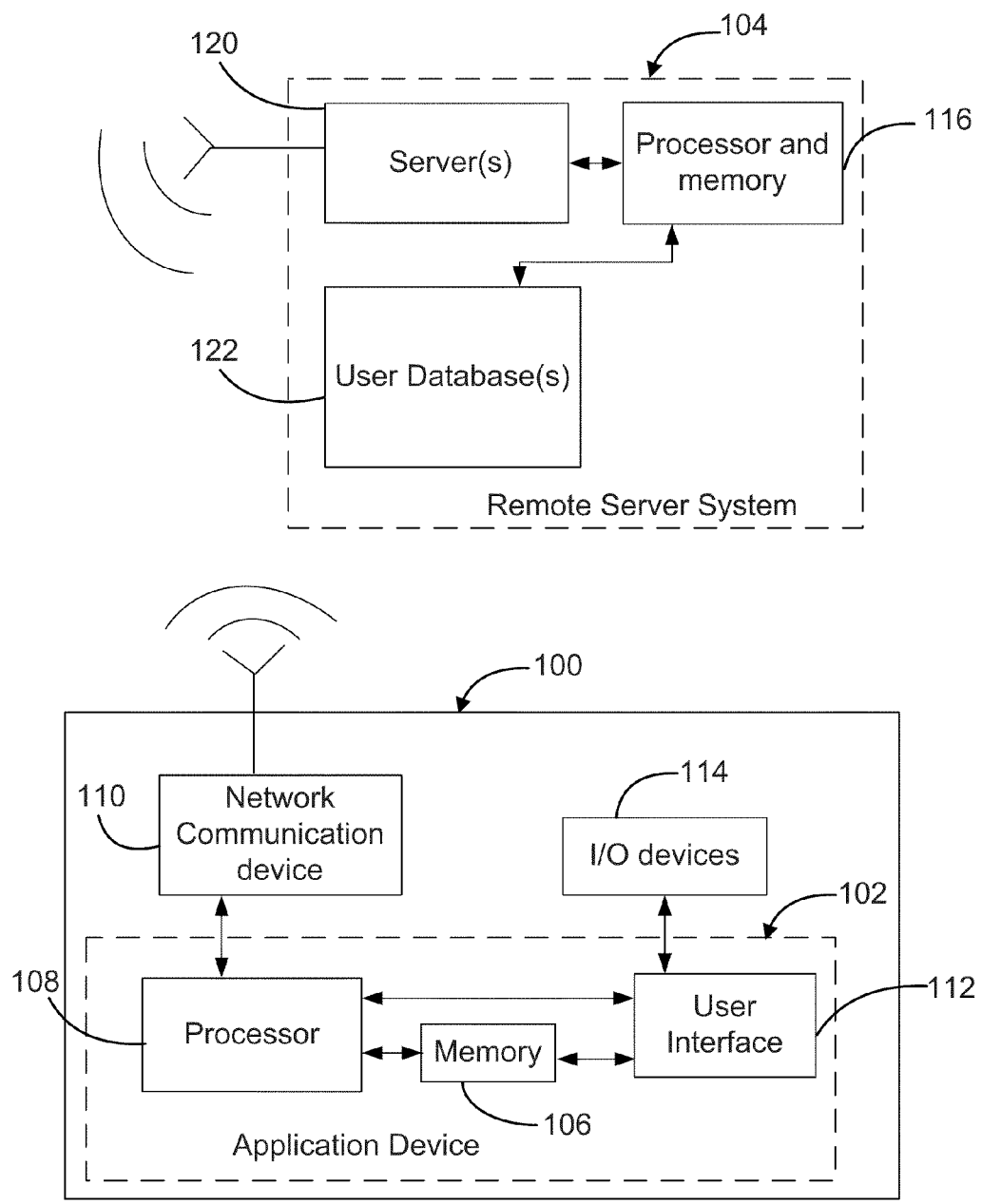
FIG. 1 is a schematic illustration of an application device for calendar sharing and scheduling, in use with a remote server in accordance with an embodiment.

In reference to FIG. 1, there is shown a schematic illustration of an application device 102 for calendar sharing and scheduling, in use with a remote server system 104 in accordance with an embodiment. The application device 102 can be embodied in a computing device such as a regular personal computer, desktop or laptop, or a handheld, mobile processing device such as a mobile phone. Any of these alternatives is herein illustrated as device 100 and, for simplicity of the remaining description, referred to as a mobile phone. The mobile phone 100 has a communication device 110 and input/output device(s) 114.

The application device 102 has a memory 106, a processor 108, and a user interface 112. The processor 108 accesses the remote server system 104 over a communication network and via the communication device 110.

The user interface 112 receives user-input information by allowing a user to enter information via the I/O devices 114. For example, a user may interact with the device 100 via a touch screen, device buttons, and/or by manipulating the device when embodied as a handheld for example, in order to activate a movement sensor (aka accelerometer(s)) within the device 100 (e.g. by shaking, moving or rotating a mobile phone for example).

The user interface 112 allows a user to enter his/her user identification (ID), contact IDs, meeting duration(s); select participant(s) from a contact list to send participant(s)' IDs and to make meeting requests; make scheduling requests (aka database queries) to find blocks of time during which a meeting of participants could take place in accordance with the calendars of the contacts/participants (referred to as contact calendars) shared with the user. The user interface 112 also communicates with the I/O devices 114 to display the contact calendars and the user's calendar on a display of the device 100.

The scheduling request should not be confused with the meeting request. The scheduling request is also known as the database query. The database query is sent to the remote server to ask the server for time suggestions. Upon receipt of the database query, the server performs a search of database entities to find a block (or blocks) of time during which all participants are commonly free to suggest these to the user. The database query does not require input from the participants.

On the other hand, the meeting request which is also known as the meeting invitation, is sent to the participants and requires their input e.g. accept or reject etc. in order for the meeting to be confirmed or cancelled. The meeting request is performed after the database query, when the user selects a block of time suggested by the remote server to request the meeting from the participants.

The memory 106 communicates with the processor 108 and stores instructions to be performed by the processor 108. The instructions allow the processor 108 to perform a series of tasks as described in greater detail herein below.

The memory also stores the list of contacts with contact information such as contact IDs, respective telephone numbers, names, email addresses, SMS/MMS addresses, contact picture or avatar, contact calendars, and/or free/busy current statuses of the contacts, as well as calendar sharing settings which define the type of sharing between the user's calendar and the contact's calendar. Contact information is made accessible to the user for sending invitations to share calendars when the user and the contact are not sharing, place a call to the contact, send emails, SMS, MMS, and/or schedule meeting by sending a meeting request directly to the contact. The user interface 112 displays the relevant information on the device 100, coordinated by the processing device to achieve such actions. The memory caches respective contact information until a refresh occurs (e.g. resynchronization with the remote server system 104). The refreshing occurs upon startup of the application device 102 or may be performed manually by a user sending a refresh request via the user interface 112. The refreshing is performed not to block further interaction between the user interface 112 and the user. The user may thus pursue with meeting organization during refreshing.

It should be noted that the contact information can be retrieved from another contact tool used with the device 100, or entered manually by the user. When retrieved from another contact tool, matches between a user-entered or selected contact names, emails and other types of contact information are searched. Pictures or avatars corresponding to a contact are also transferable from the other tool to the application device 102.

Still in reference to FIG. 1, the remote server system 104 comprises a network of elements herein shown as one block 104 for illustration purposes. Server(s) 120 ensure proper communication with the network communication device 110 of the mobile phone 100. Such server(s) 120 may comprise Internet server(s) and/or mobile communication server(s). The processor and memory 116 may be embodied directly within the server(s) 120 or externally thereto as shown. Similarly for the user database(s) 122, which store all identifications and data entities of registered users. In this context, data entities should be understood as meaning information relating to the user which is stored in the database.

Although the example shown in FIG. 1 illustrates the databases 122 as being associated with the server 120, or part thereof, the design is not limited to this configuration. For example, it is possible that the server 120 retrieves data entities from exterior databases through a communication link or network. Therefore, not all the contacts (registered users) have to register their information with the same database. The remote server may collect and/or search database entities from different databases through a communication link or network.

In an embodiment, each registered user has an identification and data entities associated with the identification. Such data entities include time information, ID of the user, preferences information, time zones, buffers and filters, calendar information etc.

For instance, the calendar information may include sharing settings, synchronized calendars, past scheduling requests, invitations sent, synchronized free/busy statuses, and/or any other pertinent profile information. Preferences information may include preferences based on the time (e.g. the user may prefer to have phone meetings in the afternoon, or they may prefer in-person meetings on selected days of the week, or they may prefer to be notified of the meeting few days before etc.), preferences based on the location (e.g. depending on the location of the user, or location of the meeting), preferences based on the type of the conference (by phone, by internet, by person etc.).

The users register such data entities with the remote server system 104 first when creating an account, and at each synchronization between calendar and contact information of any typical contact, email and time management tool used on the device 100.

In the embodiment as illustrated by FIG. 1, the application device 102 receives a contact ID from the user interface 112. The contact ID identifies a contact of the user. The user ID and the contact ID are then both communicated to the remote server system 104. A contact calendar corresponding with the contact ID is then retrieved from the remote server system 104, from the user database 122 for example. The contact calendar is however only sent back to the application device 102 for display to the user via the user interface 112 when a sharing setting associated with the contact calendar or contact ID allows the sharing of the contact calendar with the user.

A user may also organize a meeting by entering a meeting duration and identifications of participants (by selecting contacts or entering contact IDs for example) via the user interface 112. In such a case, the identifications, including that of the user, are sent from the device 100 to the remote server system 104 to retrieve calendars of the participants which corresponding to the IDs when their respective sharing settings allow the sharing of their calendars with the user organizing the meeting. When the organizing user triggers or sends a scheduling request via the user interface 112, the processor 108 searches all the calendars being shared with the user to determine a block of time during which all of the participants are commonly free. The block of time has a start and end time defined by the meeting duration. Once the block of time is found, it is outputted to the user interface for display on the mobile phone 100. Multiple blocks of times can be searched and proposed to the user.

The searching optionally takes into consideration filters and buffers pre-set by each participant. This information is part of user and contact information as stored in the server system 104. Buffers allow users to insert free time blocks between meetings, ensuring smooth transition between scheduled meetings. Filters allow users to block certain time zones from ever being booked for a meeting.

Figure 2:
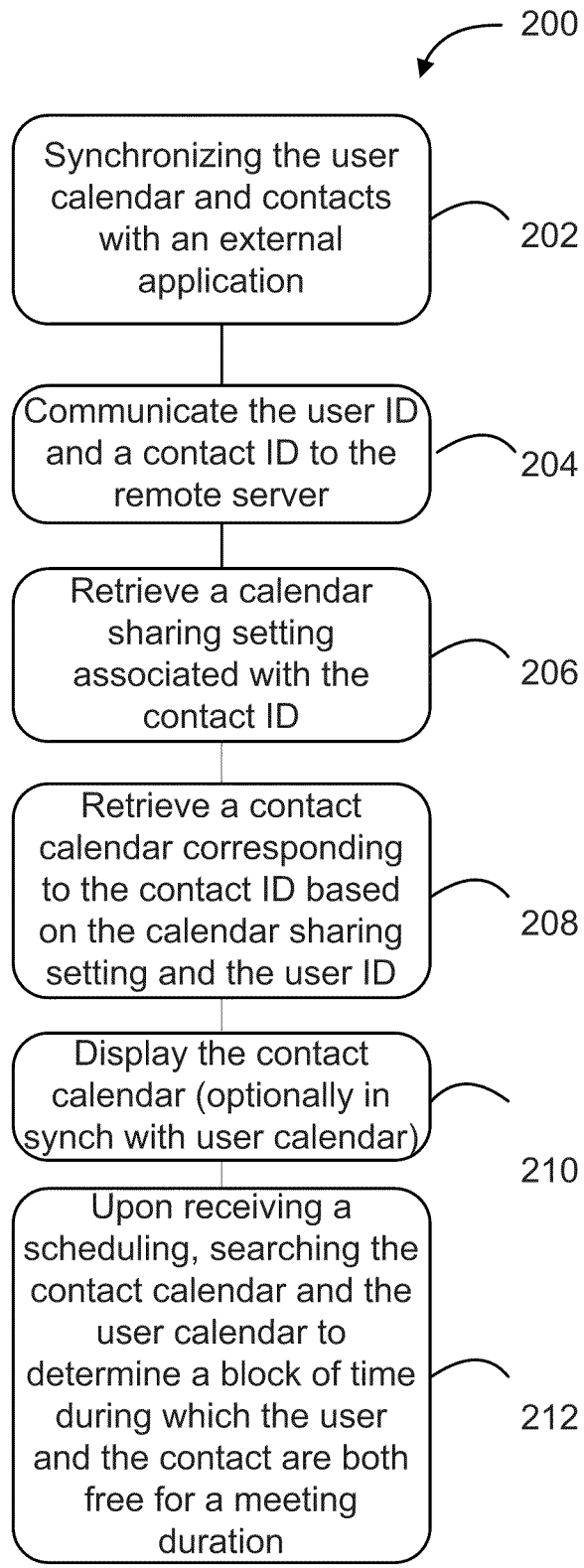
FIG. 2 is a flow chart of a method for calendar sharing and scheduling in accordance with an embodiment.

FIG. 2 is a flow chart of a method 200 for calendar sharing and scheduling in accordance with an embodiment.

In step 202, a user calendar stored on the remote server in association with the user identification (and/or a local user calendar stored locally in a memory of the processing device being used—e.g. a mobile phone or a computer) is synchronized with calendar and contact information found in another external application. The other application can be any application used by the user such as an email application with calendar or agenda tools, or an address book.

In step 204, user identification and contact identification are communicated over a communication network, from a mobile phone to a remote server.

In step 206, a calendar sharing setting associated with the contact identification is retrieved from the remote server.

In step 208, a contact calendar corresponding to the contact identification is retrieved from the remote server based on the calendar sharing setting and the user identification.

In step 210, the contact calendar is displayed on a display of the mobile phone.

In step 212, upon reception of a scheduling request, the contact calendar and the user calendar are searched to determine a block of time of a user-specified meeting duration, during which the user and the contact are both commonly free. Many blocks of time can be proposed, according to a pre-set number, in a random or time-dependent manner. If the user is unsatisfied by returned proposed blocks of time, a new secluding request can be triggered by the user and the searching starts over. A following search may have a start time defined by the last block of time proposed. Alternatively, if the searching is randomized, previously proposed blocks of time are stored in association with the user in order to return only new time propositions.

In step 212, if no block of time is found, a message to this effect is outputted to the user. A user may initially define a given start and end time within which the search is to be performed. If no end time is entered by the user, the blocks of time searched are within an unlimited future time frame. User and contact-defined time filters are taken into account during the search. In addition, when sending a scheduling request, the user can request a given request mode, such as urgent, within this week, month, quarter, year, etc. When the mode is urgent, the earliest commonly free block(s) of time are proposed to the user.

In an embodiment, step 212 is performed independently of steps 202 to 210, and involves receiving a meeting duration and identifications of participants from a user interface and communicating these to a remote server. Upon the user sending a scheduling request, the scheduling request is forwarded to the remote server. The remote server then performs a search of the calendars of the participants, as retrieved from the identifications. The search is performed to determine a block of time comprising the meeting duration, and during which all of the participants are commonly free. In this case, step 212 also involves the reception of the results of the search (i.e. no blocks of time found or a list of times) from the server and their output for display.

The above-described application and method are adaptable to comprise a series of additional functionalities as provided by the below described examples. Different tabs allow different functionalities to a user, such as knowing the presence/status of contacts, schedule meetings, manage invitations, calendar sharing requests, and/or meeting conflicts, change user settings.

Now in reference to FIGS. 3 to 18, there is shown exemplary screenshots of a graphical user interface (GUI) of a mobile phone in accordance with multiple embodiments.

Figure 3:
FIG. 3 is a schematic screenshot illustration of a graphical user interface (GUI) of a mobile phone for user registration in accordance with an embodiment.
Figure 4:
FIG. 4 is a schematic screenshot illustration of a graphical user interface (GUI) of a mobile phone for synchronizing calendar and contacts from another external application, in accordance with an embodiment.

FIGS. 3 and 4 show pages shown during user registration and account creation. In FIG. 3, several data entry fields such as are entered by the user for storage in a remote server. In FIG. 4, calendar and contact synchronization can be performed only for the user-selected contacts provided in the list. Such synchronization enables fetching of information pertaining to contacts of the user as found within other externally used tools such as email providers and applications for example.

Figure 5:
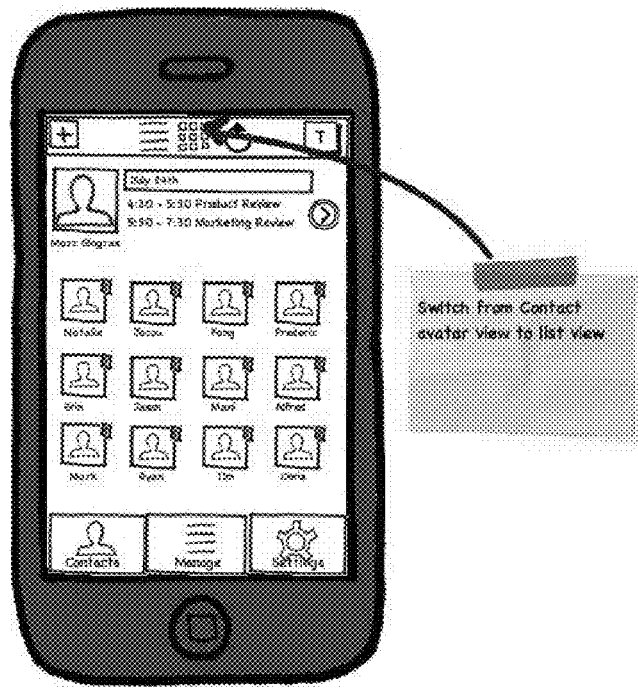
FIG. 5 is a schematic screenshot illustration of a graphical user interface (GUI) of a mobile phone which shows an avatar view of contacts in accordance with an embodiment.
Figure 6:
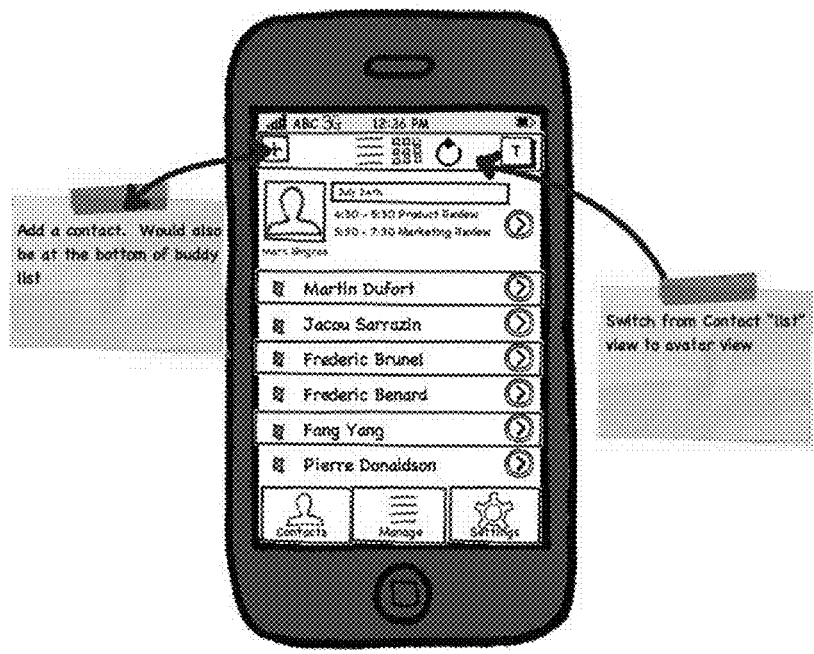
FIG. 6 is a schematic screenshot illustration of the (GUI) of FIG. 3 showing a list view of the contacts in accordance with an embodiment.

As seen in FIGS. 5 and 6 for example, the graphical user interface has a contact field for allowing a user to select a contact and/or input an identification of a new contact for example. In FIG. 5, all of the contacts of a logged user which share their calendars with the logged user are displayed as selectable contact icons. In FIG. 6, the contacts are simply listed. The user icon or name will be placed at the top by default for easy reference. Other sorting and icon placement views are offered to the user.

FIGS. 5 and 6 can be considered as a presence/status tab since it allows the logged user to see the current status of each sharing contact. A free/busy icon indicates whether the sharing contact is currently free or busy.

The contact icons can be edited by the user and selected to edit sharing settings with each contact, view contact information, see the contact calendar in a detailed view, and invite contacts which are not sharing any information to share their calendar.

Figure 7:
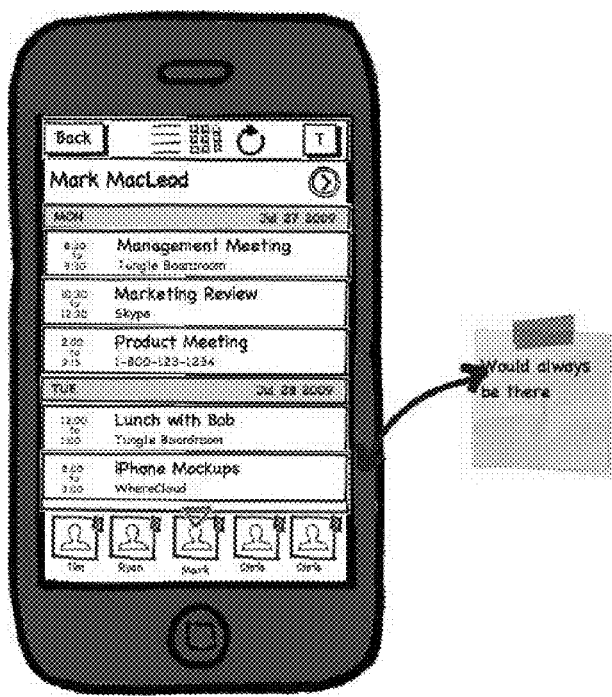
FIG. 7 is a schematic screenshot illustration of a mobile phone GUI which shows a contact calendar in accordance with an embodiment.
Figure 8:
FIG. 8 is a schematic screenshot illustration of the GUI of FIG. 5 showing only a busy/free view of the contact calendar in accordance with an embodiment.

FIGS. 7 and 8 show different versions of a contact calendar. In FIG. 7, a complete view of a contact calendar is shown. This view is available to a user only when the calendar sharing settings of the contact allows the user to see such a complete view of his/her calendar. The contact calendars are displayed to the user using the user's geographical time zone. Meeting details can be presented in greater details when a complete calendar is shared with the user. A scrollable list of contacts is present within the window in order to switch from one contact calendar to another one.

Figure 9:
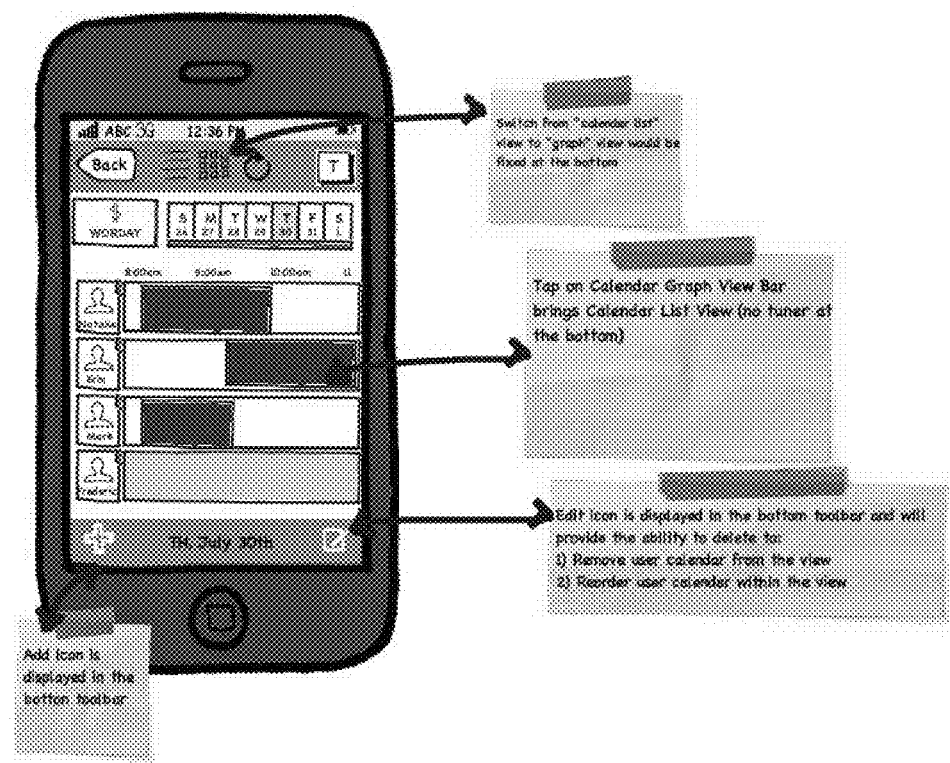
FIG. 9 is a schematic screenshot illustration of a mobile phone GUI which shows multiple contact calendars in accordance with an embodiment.
Figure 10:
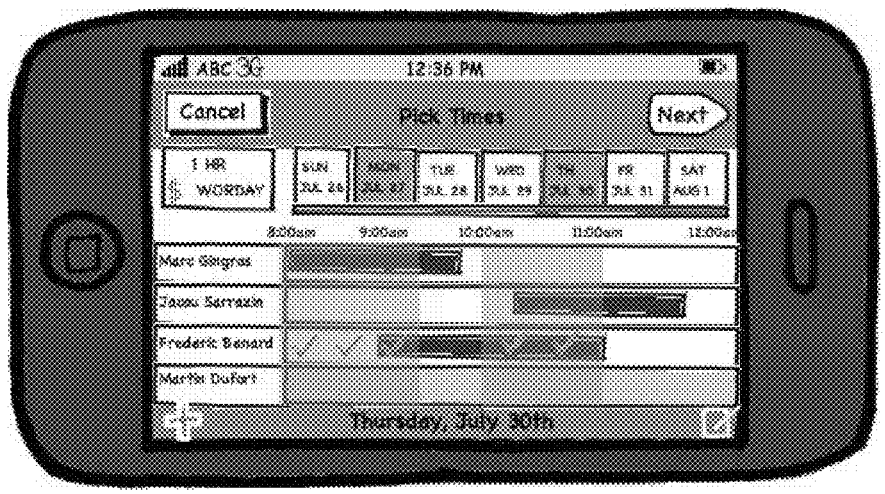
FIG. 10 is schematic screenshot illustration of a the GUI of FIG. 7, showing a landscape view of the multiple contact calendars according to a scheduling mode.

FIGS. 9 and 10 show different versions of a calendar field. In FIG. 9, the calendar field has a plurality of contact calendar fields and respective contact identification icons. The contact ID icons are present to one side of the contact calendar fields. Each one of the contact identification icons identifies a respective one of the user and the contacts of the user. The view corresponds to a graph view whereby each contact calendar can be made to scroll according to time along a line when touched via the touch screen for example. The contact calendar fields each respectively display at least a portion of a user calendar and a contact calendar.

All contact calendars are synchronized in time with a time block selection zone located above the contact calendar fields. The synchronization takes into account contact geographical addresses for time zone differences existing between users. This zone gives the time and date, and allows the user to select a block of time. Once a block of time is selected, a user's time block can be directly booked according to entered event details, a meeting request can be sent to selected contacts based on the block(s) of time selected. A send meeting request button (not shown in this view) allows the request to be sent.

In FIG. 10, the display is according to a landscape view. This representation mode corresponds to a scheduling mode according to which highlighted blocks of time in the time block selection zone correspond to user-selected blocks of time which are to be used in sending a meeting request to check-marked participants.

The view of FIGS. 9 and 10 can be customized with favorite contacts for example, and triggered upon a specific interaction between the user and the mobile phone, such as rotating the phone sideways.

When selected, the + sign in FIGS. 9 and 10 allow the user to directly enter a new contact and invite the new contact to share calendars. A prompt will ask the user to enter the new contact's ID, select a sharing setting defining the sharing of the user calendar with this new contact, enter an optional message and send the invitation. Once accepted by the new contact invitee, the calendars of the user and the new contact are shared according to the settings of each.

Figure 11:
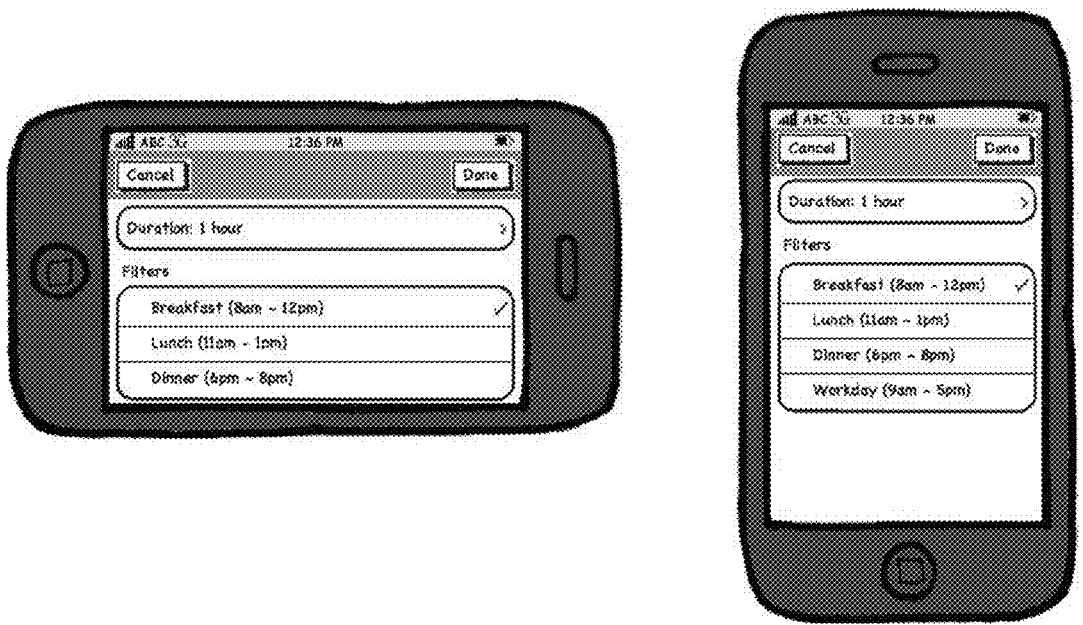
FIG. 11 is schematic screenshot illustration of a mobile phone GUI which shows details of user-defined filters in accordance with an embodiment.

FIG. 11 shows details of templates or time filters which may be user-defined. Such filters assist users in scheduling meetings and accepting meeting requests. For example, breakfast, lunch and dinner start and end times may be blocked from meeting scheduling. Other filters may be defined by each user, such as vacations, work-day availability, and the like.

Figure 12:
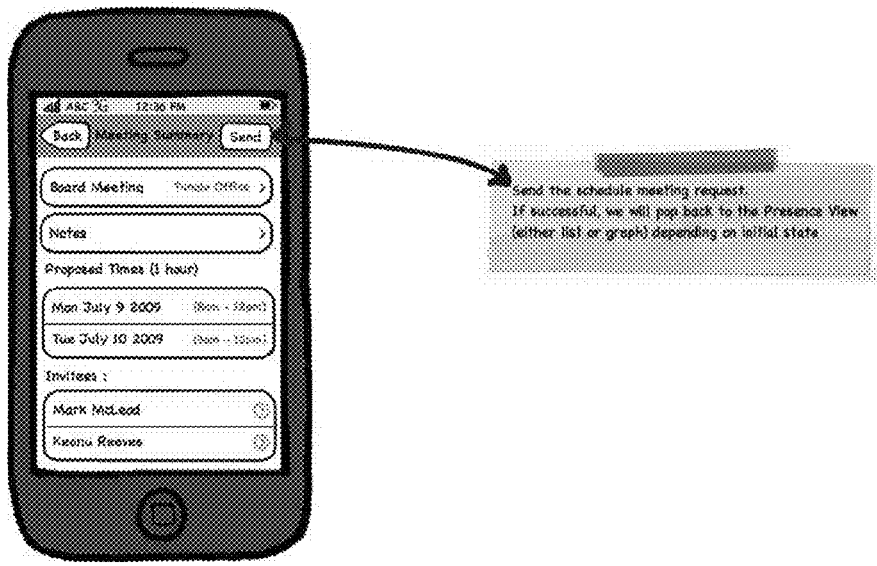
FIG. 12 is a schematic screenshot illustration of a mobile phone GUI for creating and sending a meeting request to invitee(s) in accordance with an embodiment.
Figure 13:
FIG. 13 is a schematic screenshot illustration of a mobile phone GUI which shows an invitee selection page in accordance with an embodiment.

FIG. 12 shows details of an example of a meeting request being filed by a user. Meeting details are entered by the organizing user clicking on the various fields. Several functions are configurable, such as selecting details from a list of recently used locations and subjects. In an embodiment, the user also selects invitees from a list such as shown in FIG. 13. The checkmarks on the left hand side of the contact names show the selection. The icons found on the right-hand sides of the contacts indicate that these contacts are currently registered with the system; depending on their settings, their calendars may be shared with the user via the application.

Figure 14:
FIG. 14 is a schematic screenshot illustration of a mobile phone GUI which shows a confirmation prompt before sending a meeting invitation/request in accordance with an embodiment.

FIG. 14 shows a confirmation screen prompting the user before the meeting invitation (aka request) is to be sent to the invitees.

Figure 15:
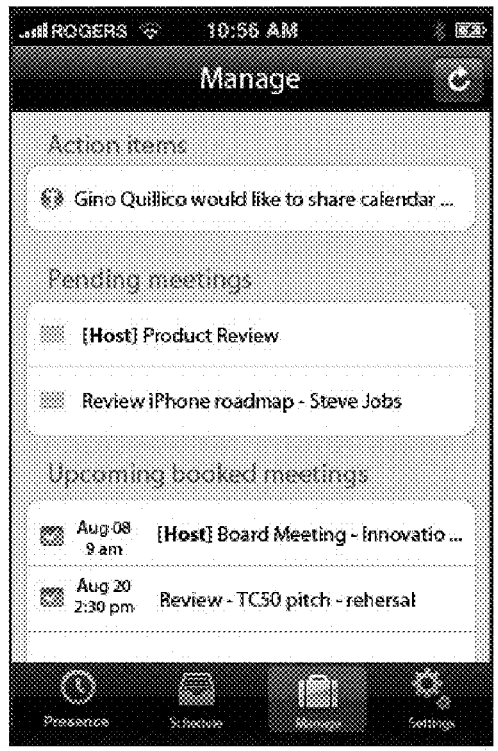
FIG. 15 is a schematic screenshot illustration of a mobile phone GUI for managing user-related actions, pending and booked meetings in accordance with an embodiment.
Figure 16:
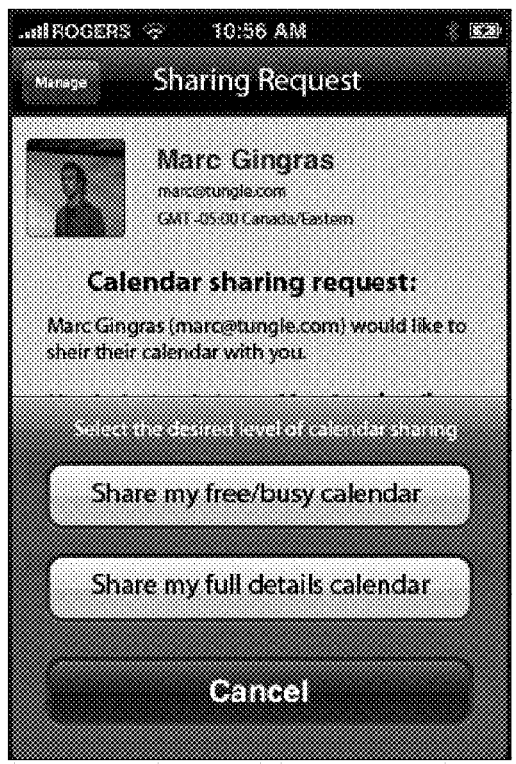
FIG. 16 is a schematic screenshot illustration of a mobile phone GUI which shows a sharing request in accordance with an embodiment.

Other GUI views are also available to help he user in managing invitations to share calendars (aka sharing requests), answer meeting invitations (aka meeting requests), manage meeting conflicts and ready to be booked meeting (when all the invitees have sent their availability), view upcoming booked meetings, edit user settings and information (username, password, default configurations, etc.). FIG. 15 shows a manage tab while FIG. 16 shows a sharing request wherein a user may select to share his/her calendar with the contact according to either a "free/busy" fashion or a "full details" fashion (aka complete calendar).

Figure 17:
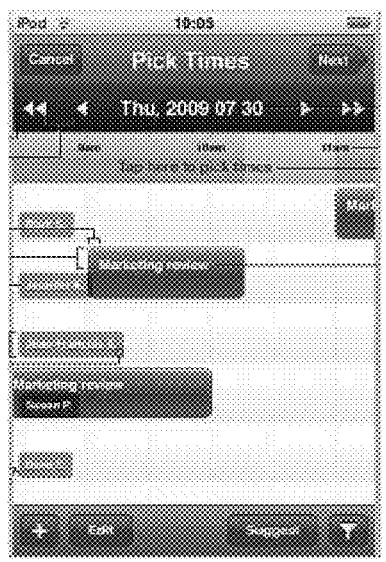
FIG. 17 is a schematic screenshot illustration of a mobile phone GUI which shows multiple contact calendars in a scheduling view for requesting scheduling suggestions in accordance with an embodiment.

Now referring to FIG. 17, a mobile phone GUI shows contact calendars in a scheduling view, according to which a user may send a scheduling request by pressing a "Suggest" button or shaking the phone.

Figure 18:
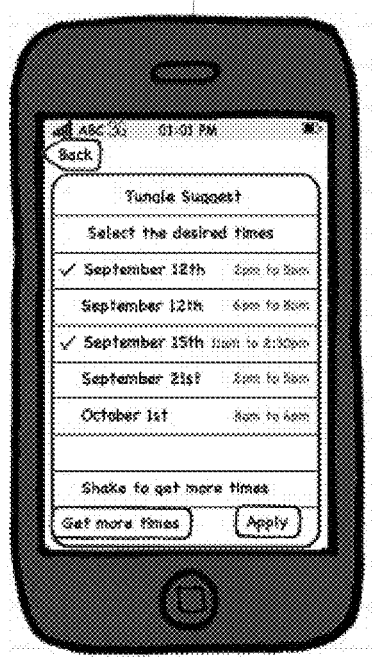
FIG. 18 is a schematic screenshot illustration of the GUI of FIG. 17 showing a list of time suggestions returned after a scheduling request (aka database query) has been made, in accordance with an embodiment

Once the scheduling request is sent, various blocks of time are returned and listed as shown in FIG. 18. These blocks of time are suggested in light of information entered in a meeting request for example. The user makes a selection from these blocks of time to decide upon a final meeting time. When the user is unsatisfied with the suggestions, the "get more times" button is selected or the phone is shaken by the user to fetch more time suggestions. The additional time suggestions are not identical to the first ones obtained. The user may re-shake as many times as he/she wants. The new suggested times get appended to the list of the initially suggested times—and the user can select all the ones he/she wants. By clicking the "apply" button, the selected times are used to finalize a meeting request for example.

As exemplified in FIGS. 3 to 18, this document describes a graphical user interface (GUI) for calendar sharing and scheduling. The GUI comprises a contact field for allowing a user to perform at least one of: selecting a contact and inputting an identification of the contact. The GUI also comprises a calendar field comprising a plurality of contact calendar fields and respective contact identification icons. Each one of the contact identification icons identifies a respective one of the user and the contact. The contact calendar fields display at least a synchronized portion of a user calendar and of a contact calendar, as retrieved based on the identification of the contact. The calendar field comprises a time block selection zone, for allowing the user to select a block of time. The GUI may also include an invitation icon for sending a meeting request to the contact based the block of time selected.

In an embodiment, the time block selection zone is provided above the contact calendar fields.

Figure 19:
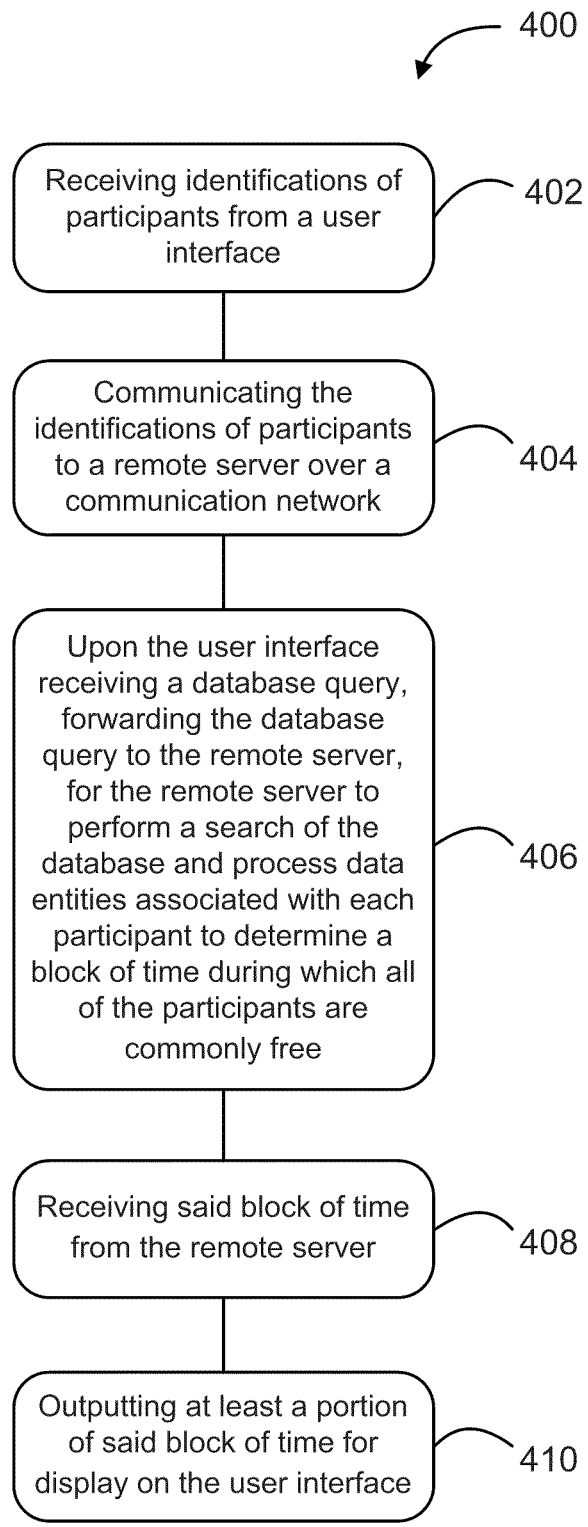
FIG. 19 is a flowchart of a method for scheduling a meeting of participants, in accordance with an embodiment.

As described earlier, the present application describes a method for scheduling a meeting of participants, and an application device for implementing the method. FIG. 19 is a flow chart of a method 400 for scheduling a meeting of participants, each having an identification and data entities associated with the identification which are synchronized with a database.

Step 402 comprises receiving identifications of participants from a user interface. The identifications of participants may be entered by the user to select the participants with whom the user wants to meet. For example the user may select the participants using a keyboard, a touch screen, a voice command interface or any such means.

Step 404 comprises communicating the identifications of participants to a remote server over a communication network.

At step 406, a database query is received at the user interface. The database query is forwarded to the remote server to perform a search of the database and process data entities associated with each participant to determine a block of time during which all of the participants are commonly free.

It is important to note that steps 404 and 406 may be performed at the same time. However, the method is not limited to this scenario.

At step 408, the block of time found by the remote server is received from the remote server. At step 410, at least a portion of the block of time is output for display on the user interface. The block of time may be displayed as a table on the user interface. In an embodiment, the block of time may include a plurality of time intervals. These time intervals may be displayed in the table, for the user selection.

While preferred embodiments of the invention have been described above and illustrated in the accompanying drawings, it will be evident to those skilled in the art that modifications may be made therein without departing from the essence of this invention. Such modifications are considered as possible variants comprised in the scope of the invention.

The invention claimed is:

1. A system for determining a block of time based on participant identification and data entities synchronized with a plurality of calendar databases, the system comprising:
   a device; and
   a remote server, wherein:
   the device has access to the remote server via a communication network and comprises a user interface for receiving identifications of participants of a meeting, and a database query;
   the device further, upon receipt of the database query, communicates the identifications of the participants to the remote server over the communication network;
   the remote server receives the identifications of the participants from the device;
   the remote server retrieves, from at least two of the plurality of calendar databases, data entities for the participants of the meeting including calendar information and processes said retrieved data entities to determine a block of time during which all of the participants of the meeting are free, the at least two of the plurality of databases from which the data entities are retrieved comprising a first calendar database with which first data entities are synchronized for a first calendar service which is employed by at least one of the participants, and a different second calendar database with which second data entities are synchronized for a second calendar service which is employed by at least one other of the participants;
   the remote server further transmits an identification of said block of time to the device;
   the device receives the identification of said block of time from the remote server; and
   the device outputs an identification of at least a portion of said block of time for display on the user interface.

2. The system of claim 1, wherein:
   a) the user interface of the device further receives a time duration; and
   b) the device further receives the time duration from the user interface, and
   upon receipt of the database query, communicates the time duration to the remote server, wherein the block of time comprises the time duration.

3. The system of claim 1, wherein
   c) the user interface of the device further receives a selection of the block of time; and
   d) the device receives the selection of the block of time from the user interface, and books the selected block of time on a calendar.

4. The system of claim 3, wherein
   e) the user interface of the device further receives a meeting request; and
   f) the device receives the meeting request from the user interface and sends the meeting request in accordance with the block of time selected.

5. The system of claim 1, wherein the device retrieves, from the remote server, calendars of the participants of the meeting, when settings associated with the calendars allow a sharing of the calendars, and outputs the calendars to the user interface for display.

6. The system of claim 1, wherein the remote server repeats at least one of the retrieving and the processing of said retrieved data entities to determine a different block of time during which all of the participants of the meeting are commonly free.

7. The system of claim 6, wherein an identification of the different block of time is output to the user interface for display.

8. The system of claim 1, wherein the device is implemented for use with a mobile phone which includes an accelerometer, and wherein the database query is triggered by inducing a given acceleration to the accelerometer.

9. The system of claim 7, wherein a further database query is triggered by inducing the given acceleration to the accelerometers again thereby resulting in a determination by the remote server of a different block of time during which all of the participants are commonly free.

10. The system of claim 1, wherein the database query takes into consideration at least one of filters and buffers pre-set by each of the participants of the meeting.

11. The system of claim 1, wherein the device causes a plurality of blocks of time to be presented on the user interface.

12. The system of claim 1, wherein at least one of the plurality of databases is part of the remote server.

13. The system of claim 1, wherein at least one of the plurality of databases is an external database which is accessible through a communication link.

14. The system of claim 1, wherein, upon determining that no block of time is found during which all participants of the meeting are free, the device causes the user interface to display a message to that effect.

15. The system of claim 1, wherein the user interface allows selection of at least one of start time and end time defining a given period, the block of time being restricted to the given period.

16. The system of claim 15, wherein, upon determining that no end time is selected and no block of time is found during which all participants of the meeting are free, the remote server performs at least one of the retrieving and the processing of said retrieved data entities within a future time frame in which no start or end dates are defined.

17. A computer-implemented method in a server for determining a block of time based on participant identification and data entities synchronized with a plurality of electronic databases, the method comprising:
receiving, by the server, identifications of participants of a meeting;
receiving, by the server, a database query;
retrieving, by the server, from at least two databases of the plurality of databases, data entities for each of the participants of the meeting including calendar information, the at least two of the plurality of databases from which the data entities are retrieved comprising a first calendar database with which first data entities are synchronized for a first calendar service which is employed by at least one of the participants, and a different second calendar database with which second data entities are synchronized for a second calendar service which is employed by at least one other of the participants;
processing, by the server, said retrieved data entities to determine a block of time during which all of the participants of the meeting are commonly free; and
transmitting an identification of said block of time from the server.

18. The method of claim 17, further comprising:
receiving a time duration, wherein the block of time comprises the time duration.

19. A computer-implemented method, in a system comprising a device and a remote server, for processing participant identification and data entities synchronized with a plurality of databases, the method comprising:
receiving, by the device, the identifications of participants of a meeting;
receiving, by the device, a start time and an end time identifying a given period;
communicating, by the device, the identifications of participants, the start time and the end time to the remote server;
receiving, by the remote server, from at least two electronic databases, data entities for each of the participants of the meeting, the at least two of the plurality of databases from which the data entities are retrieved comprising a first calendar database with which first data entities are synchronized for a first calendar service which is employed by at least one of the participants, and a different second calendar database with which second data entities are synchronized for a second calendar service which is employed by at least one other of the participants;
processing, by the remote server, the received data entities for each of the participants of the meeting, the data entities for each of the participants of the meeting having free blocks of time during which the respective participant has a free status, to select a block of time, from the free blocks of time, which is common to the data entities of each participant having a free status during the given period;
communicating, by the remote server, said block of time which is common to the device; and
outputting an identification of at least a portion of said block of time which is common for display on a user interface.

20. A server for determining a block of time based on participant identification and data entities synchronized with a plurality of electronic databases, the server comprising:
a processor accessible via a communication network;
a memory operatively coupled to the processor, the processor storing instructions to be performed by the processor, the instructions configured to cause the processor to:
receive identifications of the participants;
retrieve from at least two of the plurality of databases, data entities for each of the participants of the meeting including calendar information, the at least two of the plurality of databases from which the data entities are retrieved comprising a first calendar service database with which first data entities are synchronized for at least one of the participants and a different second calendar service database with which second data entities are synchronized for at least one other of the participants;
process said retrieved data entities to determine a block of time during which all of the participants of the meeting are free; and
transmit an identification of said block of time.

21. The server of claim 20, wherein the instructions further cause the processor to receive a time duration, wherein the block of time comprises the time duration.

22. The server of claim 20, wherein the instructions stored in the memory cause the processor to transmit calendars of the participants of the meeting when settings associated with the calendars allow a sharing of the calendars.

23. The server of claim 20, wherein the instructions stored in the memory cause the processor to repeat at least one of the retrieving and the processing of said retrieved data entities to determine a different block of time during which all of the participants are commonly free.

24. The server of claim 23, wherein an identification of the different block of time is transmitted.

25. The server of claim 20, wherein the processing said retrieved data entities takes into consideration at least one of filters and buffers pre-set by each participant.

* * * * *